(12) United States Patent
Jalfon et al.

(10) Patent No.: US 8,054,921 B2
(45) Date of Patent: Nov. 8, 2011

(54) MITIGATING NOISE CREATED BY SPREAD SPECTRUM CLOCKS

(75) Inventors: Marc Jalfon, Zichron Yaakov (IL); Rafi Ravid, Neve Monoson (IL)

(73) Assignee: Intel Corporation, Santa Clara, CA (US)

( * ) Notice: Subject to any disclaimer, the term of this patent is extended or adjusted under 35 U.S.C. 154(b) by 982 days.

(21) Appl. No.: 11/963,021

(22) Filed: Dec. 21, 2007

(65) Prior Publication Data

US 2010/0309955 A1    Dec. 9, 2010

(51) Int. Cl.
*H03D 1/04* (2006.01)
(52) U.S. Cl. .................................................... 375/346
(58) Field of Classification Search .............. 375/130, 375/346, 355

See application file for complete search history.

(56) References Cited

U.S. PATENT DOCUMENTS

| 7,606,546 B1* | 10/2009 | Liu et al. ...................... 455/260 |
| 2007/0210832 A1* | 9/2007 | Abel et al. ...................... 326/93 |
| 2008/0037693 A1* | 2/2008 | Andrus et al. .................. 375/359 |
| 2010/0225620 A1* | 9/2010 | Lee .............................. 345/204 |

* cited by examiner

*Primary Examiner* — Don N Vo
(74) *Attorney, Agent, or Firm* — Blakely, Sokoloff, Taylor & Zafman LLP

(57) ABSTRACT

A platform to mitigate noise caused by spread spectrum clock signals. The platform may comprise a noise mitigation block, which may include a first set of analog-to-digital converters, a second analog-to-digital, and a noise canceller. The first set of analog-to-digital converters may generate clock samples by digitizing the plurality of spread spectrum clock signals, which are provided as inputs to the noise mitigation block. The second analog-to-digital converter may generate data samples by digitizing the data signal. The noise canceller coupled to the first set of analog-to-digital converters and the second analog-to-digital converter may identify an interference portion in the data signal using the clock samples and the data samples and remove the interference portion from the data signal.

21 Claims, 3 Drawing Sheets

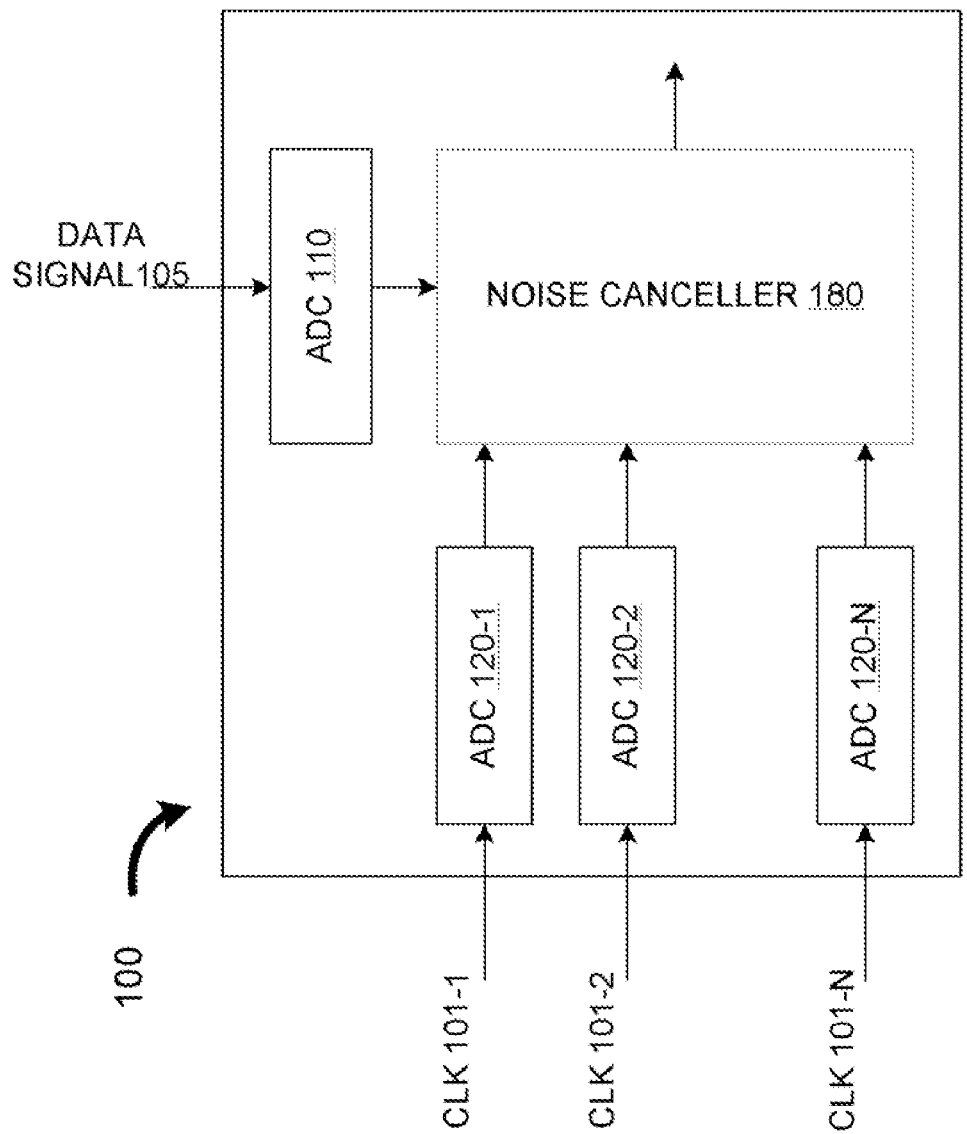

MITIGATING NOISE CREATED BY SPREAD SPECTRUM CLOCKS

BACKGROUND

Platform noise is often a limiting factor to the performance of one or more components provisioned in a platform such as a modem or a global positioning system (GPS). At least a portion of the noise may be caused due to the electromagnetic interference (EMI) generated by the platform clocks. In one prior approach, a dither is introduced to the clock frequency that transforms the clock harmonics from a narrow spectral line to a spread spectrum, which has lower peak spectral density. However, in some platforms, spreading of the clock aggravates the noise as the interference becomes a broadband white noise, which may be more difficult to handle. In one prior approach, the platform may provision multiple antennas and channels to reduce the interference. However, provisioning multiple antennas and channels to reduce the interference may be cost prohibitive and designing platforms with multiple channels may also be complex.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 1 illustrates a noise mitigation block, including noise mitigating technique according to one embodiment.

DETAILED DESCRIPTION

Figure 3:
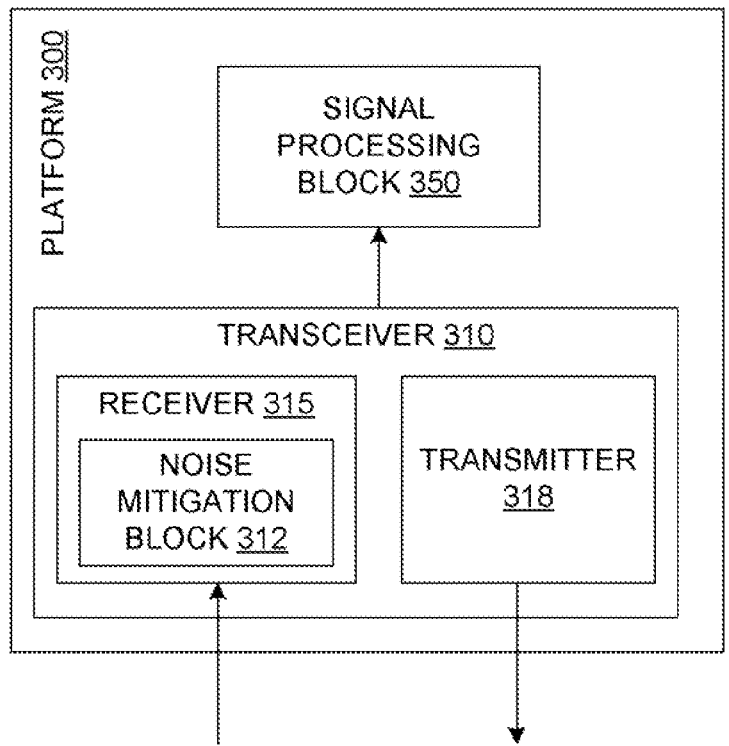
FIG. 3 illustrates a communication platform in which noise mitigating technique is used in accordance with at least one embodiment of the invention.

The following description describes embodiments of a technique for mitigating noise generated by spread spectrum clocks. In the following description, numerous specific details such as logic implementations, resource partitioning, or sharing, or duplication implementations, types and inter-relationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, and digital signals). Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

A noise mitigation block 100, which may support noise mitigating technique in accordance with one embodiment, is illustrated in FIG. 1. In one embodiment, the noise mitigation block 100 may comprise analog-to-digital converters (ADCs) 110 and 120-1 to 120-N and a noise canceller 180. In one embodiment, spread spectrum clock signals 101-1 to 101-N, which contribute most EMI, may be identified while designing and testing the platform. In one embodiment, the spread spectrum clocks 101-1 to 101-N may be internal to a platform such as a modem and a GPS system and may provided as inputs to the noise mitigation block 100, which may be a portion of the platform. In one embodiment, the clocks 101-1 to 101-N that are identified to contribute most EMI may be provided as inputs to the noise mitigation block 100.

In one embodiment, the analog-to-digital converters 120-1 to 120-N may receive the spread spectrum clock signals 101-1 to 101-N respectively. In one embodiment, the analog-to-digital converters 120-1 to 120-N may generate digital samples ('clock samples') of the clock signals 101-1 to 101-N. In one embodiment, the analog-to-digital converters 120-1 to 120-N may sample the clock signals 101-1 to 101-N at a Nyquist rate, which is at least twice the highest frequency component of the clock signals 101-1 to 101-N. In one embodiment, the output of the analog-to-digital converters 120-1 to 120-N may be provided to the noise canceller 180.

In one embodiment, the analog-to-digital converter 110 may receive a data signal 105 received over a communication channel and may generate digital samples (data samples'). In one embodiment, the analog-to-digital converter 110 may sample the data signal 105 at a Nyquist rate, which is at least twice the highest frequency component of the data signal 105. In one embodiment, the output of the analog-to-digital converters 110 may be provided to the noise canceller 180.

In one embodiment, the noise canceller 180 may reduce the noise in the data signal 105 by removing the interference portion of the data signal 105 that is correlated to the clock samples. In one embodiment, the noise canceller 180 may comprise a classical Wiener filtering technique to perform correlation between the clock samples and the data samples to identify the interference portion and then to remove the interference portion. In one embodiment, the classical Wiener filtering technique may be implemented, for example, using least mean square (LMS) algorithm.

Figure 2:
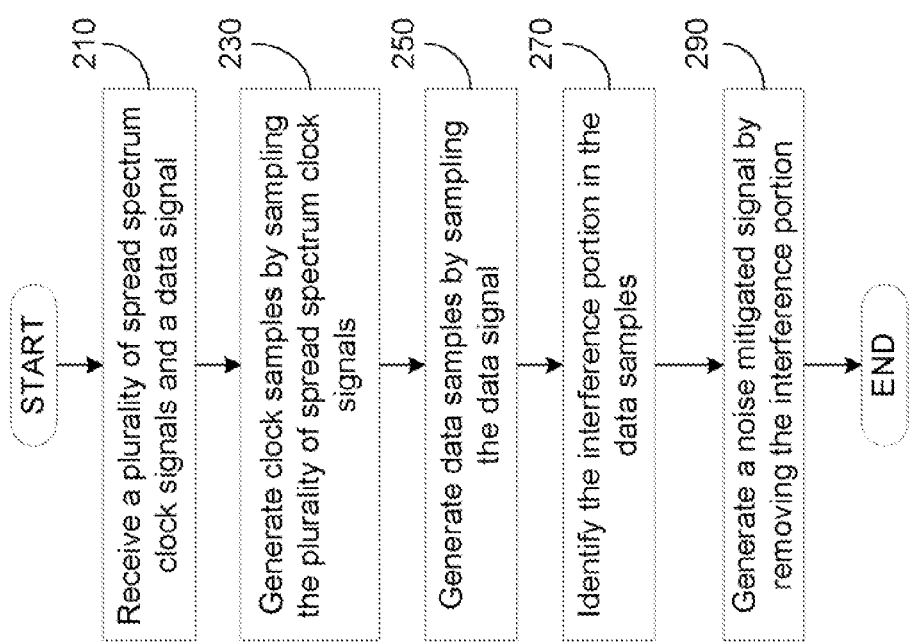
FIG. 2 illustrates a flow diagram illustrating operations that may be performed by the noise mitigation block according to one embodiment.

A flow-chart depicting an operation of the noise mitigation block 100 in one embodiment is illustrated in FIG. 2.

In block 210, the analog-to-digital converters 120-1 to 120-N may receive a plurality of spread spectrum clock signals 101-1 to 101-N.

In block 230, the analog-to-digital converters 120-1 to 120-N may generate clock samples by sampling the spread spectrum clock signals 101-1 to 101-N. In one embodiment, the analog-to-digital converters 120-1 to 120-N may sample the clock signals 101-1 to 101-N at a rate, which is at least twice the highest frequency component of the clock signals.

In block 250, the analog-to-digital converter 110 may generate data samples by sampling the data signal 105. In one embodiment, the data signal 105 may comprise information received over a communication channel.

In block 270, the noise canceller 180 may identify the interference portion in the data samples. In one embodiment, the noise canceller 180 may perform correlation between the clock samples and the data samples to identify the interference portion.

In block 290, the noise canceller 180 may generate a noise mitigated signal by removing the interference portion from the data samples. As a result, a data signal, which is free from broad-band noise, may be reconstructed using the data samples from which interference portion is removed.

A platform in which a noise mitigating technique in accordance to one embodiment of the invention is used is illustrated in FIG. 3. In one embodiment, the platform 300 may comprise a transceiver 310 and a signal processing block 350.

In one embodiment, the transceiver 310 may comprise a receiver 315 and a transmitter 318. In one embodiment, the transmitter 318 may receive one or more signals from the signal processing block 350 and may transmit the signals over a communication channel.

In one embodiment, the receiver 315 may comprise a noise mitigation block 312, which may receive spread spectrum clock signals and generate clock samples by digitizing the clock signals. In one embodiment, the spread spectrum clock signals that contribute to the EMI may be identified and provided as inputs to the noise mitigation block 312. In one embodiment, the spread spectrum clocks 101-1 to 101-N may be generated internal to the platform 300 and may cause noise, which may affect the data signal received over the communication channel. In one embodiment, the noise mitigation block 312 may also receive the data signal and generate data samples by sampling the data signal. In one embodiment, the noise mitigation block 312 may identify the interference by correlating the data samples and the clock samples and remove the interference portion from the data samples using a noise reduction filter such as the Wiener filter.

In one embodiment, the data samples, which are free from the broad-band noise, may be provided to the signal processing block 350. In one embodiment, the signal processing block 350 may perform tasks such as speech analysis, video processing, and such other similar tasks before providing the data signal to an end-user.

Figure 4:
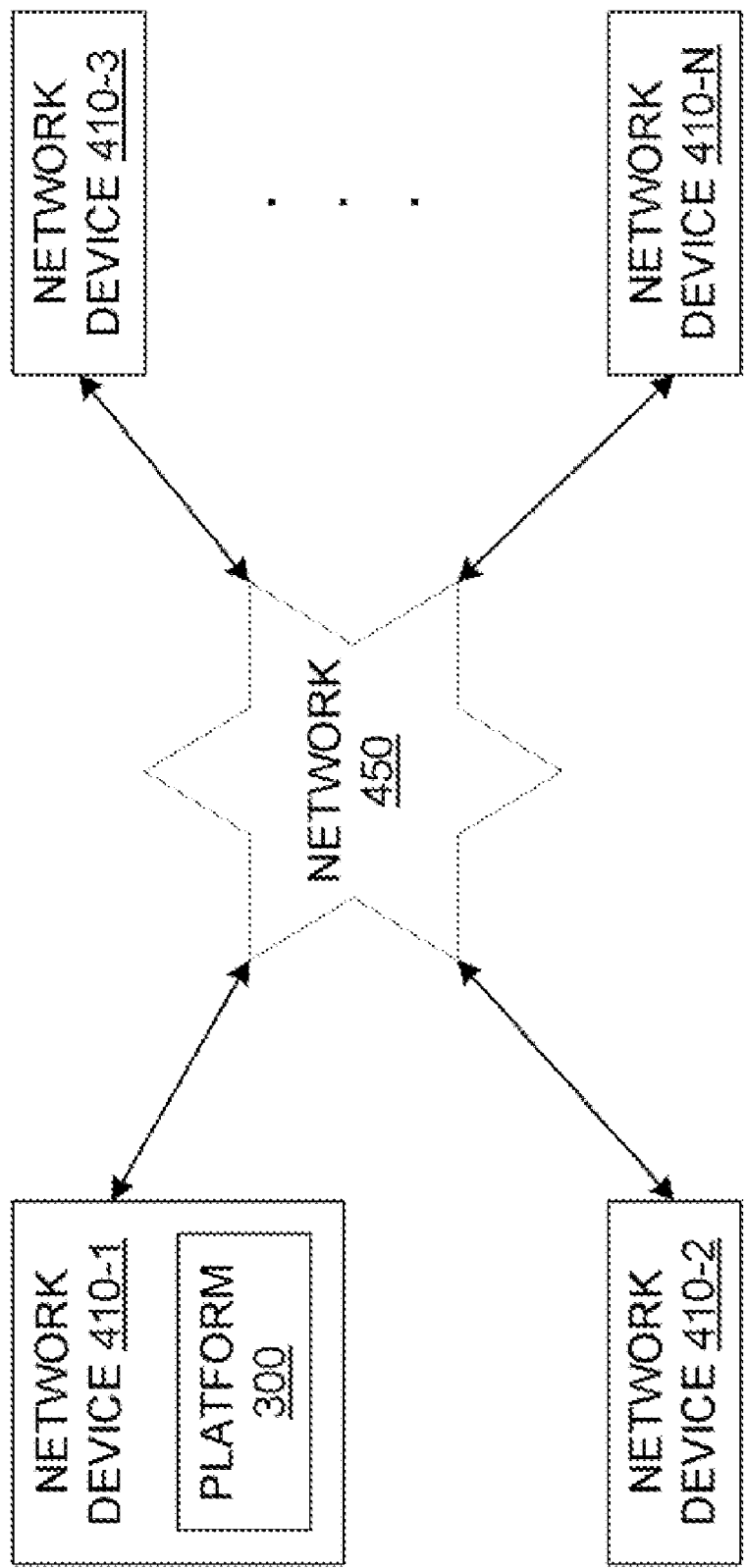
FIG. 4 illustrates a network environment in which noise mitigating technique in accordance with at least one embodiment of the invention is supported by network devices.

A network environment 400 comprising network devices in which noise mitigation technique is used is illustrated in FIG. 4. In one embodiment, the network 400 may comprise network devices 410-1 to 410-N, which may be coupled to a network 450. In one embodiment, the network devices 410-1 to 410-N may comprise a cell phone, personal digital assistant, a laptop computer, and such other devices, which may support wireless standards such as IEEE 802.11, IEEE 802.15, IEEE 802.16, and such other protocol suites.

In one embodiment, the network 450 may comprise network devices such as switches and routers, which may receive the data units from a network device 410-1 for example, process the data units, and send the data units to a network device 410-3, for example. The network 150 may enable transfer of data units between the network devices 410. The network devices of the network 450 may be configured to support various wired and wireless protocols suites such as a transport control protocol/Internet protocol (TCP/IP), IEEE 802.11, IEEE802.16, and such other protocol suites.

In one embodiment, the network device 410-3 may generate a data signal, which may be directed to the network device 410-1, for example. In one embodiment, the data signal may be transferred to the network device 410-1 over the network 450. In one embodiment, the routers and switches of the network 450 may route the data units to the network device 410-1 based on control information such as the destination address embedded in the data units.

In one embodiment, the network device 410-1 may receive the data signal from the network 450 and provide the data signal to the platform 300. In one embodiment, the platform 300 may support a noise mitigation block such as the noise mitigation block 100. In one embodiment, the platform 300 may identify the interference portion in the data signal and remove the interference portion. In one embodiment, the platform 300 may use the spread spectrum clocks contributing the EMI as the inputs and identify the interference portion in the data signal by correlating the data signal and the spread spectrum clock signals.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method to mitigate noise, comprising:
generating clock samples, using a first plurality of analog-to-digital converters, by digitizing a plurality of spread spectrum clock signals,
generating data samples, using a second analog-to-digital converter, by digitizing a data signal,
identifying an interference portion in the data signal using the clock samples and the data samples, using a noise canceller, and
removing the interference portion from the data signal, using the noise canceller.

2. The method of claim 1 further comprises identifying, using the noise canceller, the plurality of spread spectrum clock signals that contribute to the interference portion.

3. The method of claim 2, wherein the plurality of spread spectrum clock signals are identified, using the noise canceller, while testing a platform to which the spread spectrum clock signals are provided.

4. The method of claim 1 further comprises sampling the plurality of spread spectrum clock signals, using the plurality of analog-to-digital converters, at a rate that is at least twice the highest frequency component of the plurality of spread spectrum clock signals.

5. The method of claim 1, wherein the interference portion comprises broad-band noise.

6. The method of claim 1, wherein the interference portion in the data samples are identified by correlating the clock samples and the data samples.

7. The method of claim 1, wherein the interference portion is removed by the noise canceller using a wiener filter.

8. The method of claim 7, wherein the wiener filter uses an adaptive filtering technique.

9. An apparatus comprising:
a first set of analog-to-digital converters, wherein the first set of analog-to-digital converters is to generate clock samples by digitizing a plurality of spread spectrum clock signals,
a second analog-to-digital converter, wherein the second analog-to-digital converter is to generate data samples by digitizing a data signal,
a noise canceller coupled to the first set of analog-to-digital converters and the second analog-to-digital converter,
wherein the noise canceller is to identify an interference portion in the data signal using the clock samples and the data samples, and
wherein the noise canceller is to remove the interference portion from the data signal.

10. The apparatus of claim 9 further comprises identifying the plurality of spread spectrum clock signals that contribute to the interference portion.

11. The apparatus of claim 10, wherein the plurality of spread spectrum clock signals are identified while testing a platform to which the spread spectrum clock signals are provided.

12. The apparatus of claim 9, wherein the first set of analog-to digital converters is to sample the plurality of spread spectrum clock signals at a rate that is at least twice the highest frequency component of the plurality of spread spectrum clock signals.

13. The apparatus of claim 9, wherein the second analog-to-digital converter is to sample the data signal at a rate that is at least twice the highest frequency component of the data signal.

14. The apparatus of claim 9, wherein the noise canceller is to identify the interference portion in the data samples by correlating the clock samples and the data samples.

15. The apparatus of claim 14, wherein the noise canceller is to remove the interference portion using a wiener filter.

16. The apparatus of claim 15, wherein the wiener filter uses an adaptive filtering technique.

17. A system comprising:
a first network device, and
a second network device coupled to the first network device by a network,
wherein the first network device is to transmit a data signal over a communication channel,
wherein the second network device is to identify an interference portion in the data signal by correlating data samples and clock samples,
wherein data samples are generated by sampling the data signal and the clock samples are generated by sampling a plurality of spread spectrum clock signals that contribute to electromagnetic interference, and
wherein the second network device is to remove the interference portion from the data signal using adaptive filtering technique.

18. The system of claim 17 the second device further comprises a noise platform supporting a noise mitigation block,
wherein the noise mitigation block is to mitigate broadband white noise caused by the plurality of spread spectrum clock signals, and
wherein the noise mitigation block is to generate clock samples in response to receiving the plurality of spread spectrum clock signals as inputs.

19. The system of claim 17, wherein the first network device is a wireless communicating device.

20. The system of claim 19, wherein the first network device is a cellular phone.

21. The system of claim 17, wherein the second network device is a computer in which a wireless protocol suite is supported.

* * * * *